(12) United States Patent
Dally (10) Patent No.: US 9,395,738 B2
(45) Date of Patent: Jul. 19, 2016

(54) CURRENT-PARKING SWITCHING REGULATOR WITH A SPLIT INDUCTOR

(71) Applicant: NVIDIA Corporation, Santa Clara, CA (US)

(72) Inventor: William J. Dally, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 156 days.

(21) Appl. No.: 13/752,289

(22) Filed: Jan. 28, 2013

(65) Prior Publication Data

US 2014/0210429 A1    Jul. 31, 2014

(51) Int. Cl.
*H02M 3/158* (2006.01)
*G05F 3/02* (2006.01)
*H02M 1/00* (2006.01)

(52) U.S. Cl.
CPC .............. *G05F 3/02* (2013.01); *H02M 3/1588* (2013.01); *H02M 2001/0016* (2013.01); *H02M 2001/0032* (2013.01); *H02M 2003/1586* (2013.01); *Y02B 70/1425* (2013.01)

(58) Field of Classification Search
CPC ..... G05F 1/613; H02M 3/158; H02M 3/1588; H02M 3/1582; H02M 3/156; H02M 3/1584; H02M 3/33507; H02M 1/4208; H02M 2001/0045; H02M 2001/0032
USPC .................. 323/223–225, 268, 271, 282, 284
See application file for complete search history.

(56) References Cited

U.S. PATENT DOCUMENTS

| 5,367,247 | A  | 11/1994 | Blocher et al. |
| 5,488,552 | A  | 1/1996  | Sakamoto et al. |
| 5,552,694 | A  | 9/1996  | Appeltans |
| 5,600,234 | A  | 2/1997  | Hastings et al. |
| 6,636,022 | B2 | 10/2003 | Sluijs |
| 6,798,177 | B1 | 9/2004  | Liu et al. |

(Continued)

FOREIGN PATENT DOCUMENTS

| CN | 101018014 A | 8/2007 |
| CN | 101090234 A | 12/2007 |

(Continued)

OTHER PUBLICATIONS

Dally, W. J., U.S. Appl. No. 13/647,202, filed Oct. 8, 2012.

(Continued)

*Primary Examiner* — Gary L Laxton
*Assistant Examiner* — Kevin H Sprenger
(74) *Attorney, Agent, or Firm* — Zilka-Kotab, PC (57) ABSTRACT

A system and method are provided for regulating a voltage level at a load. The method configures a current control mechanism to generate a current through a first inductor and a second inductor that are coupled in series and configures a voltage control mechanism to provide a portion of the current to regulate the voltage level. The second inductor isolates the load from a parasitic capacitance of the current control mechanism. An electric power conversion device for regulating the voltage level at the load comprises the current control mechanism that is coupled to an electric power source and configured to generate a current through the first inductor and the second inductor that are coupled in series and the voltage control mechanism that is coupled to the second inductor and configured to provide a portion of the current to regulate the voltage level.

18 Claims, 9 Drawing Sheets

(56) References Cited

U.S. PATENT DOCUMENTS

| | | | |
|---|---|---|---|
| 6,961,251 B2* | 11/2005 | Porter et al. | 363/21.01 |
| 7,078,882 B2 | 7/2006 | Weng et al. | |
| 7,141,957 B2 | 11/2006 | Tolle et al. | |
| 7,298,116 B2 | 11/2007 | Sluijs | |
| 7,327,124 B2 | 2/2008 | Liu et al. | |
| 7,495,419 B1 | 2/2009 | Ju | |
| 7,501,805 B2 | 3/2009 | Chen et al. | |
| 7,557,554 B2 | 7/2009 | Chang | |
| 7,733,072 B2 | 6/2010 | Kanakubo | |
| 7,782,027 B2* | 8/2010 | Williams | 323/266 |
| 7,852,056 B2 | 12/2010 | Nishida | |
| 7,906,943 B2 | 3/2011 | Isobe et al. | |
| 7,906,949 B1 | 3/2011 | Sutardja et al. | |
| 7,977,930 B2 | 7/2011 | Chang | |
| 8,111,052 B2* | 2/2012 | Glovinsky | 323/225 |
| 8,237,421 B1 | 8/2012 | Shahani | |
| 8,508,208 B2 | 8/2013 | Klein | |
| 8,513,935 B2 | 8/2013 | Brokaw | |
| 8,674,667 B2* | 3/2014 | Lin et al. | 323/266 |
| 8,710,814 B1 | 4/2014 | Wile | |
| 8,710,820 B2* | 4/2014 | Parker | 323/288 |
| 8,729,881 B2 | 5/2014 | Chang | |
| 8,860,387 B2 | 10/2014 | Kobayashi | |
| 2001/0046145 A1 | 11/2001 | Oknaian et al. | |
| 2002/0093315 A1 | 7/2002 | Sluijs | |
| 2002/0145891 A1 | 10/2002 | Ling | |
| 2004/0119446 A1* | 6/2004 | Harrington et al. | 323/222 |
| 2005/0007080 A1 | 1/2005 | Wake | |
| 2005/0024908 A1 | 2/2005 | Gizara | |
| 2005/0068794 A1 | 3/2005 | Weng et al. | |
| 2005/0180236 A1 | 8/2005 | Thiele et al. | |
| 2005/0206358 A1 | 9/2005 | Van Der Horn et al. | |
| 2005/0258889 A1 | 11/2005 | Tolle et al. | |
| 2006/0043943 A1 | 3/2006 | Huang et al. | |
| 2006/0072252 A1 | 4/2006 | Sluijs | |
| 2007/0114985 A1 | 5/2007 | Latham et al. | |
| 2008/0055940 A1 | 3/2008 | Lawson et al. | |
| 2008/0150508 A1 | 6/2008 | Sohma | |
| 2008/0158915 A1 | 7/2008 | Williams | |
| 2008/0191678 A1 | 8/2008 | Feldtkeller et al. | |
| 2008/0252273 A1 | 10/2008 | Woo et al. | |
| 2008/0252276 A1 | 10/2008 | Omet et al. | |
| 2008/0303502 A1 | 12/2008 | Haiplik | |
| 2008/0315850 A1 | 12/2008 | Nishida | |
| 2009/0039852 A1 | 2/2009 | Fishelov et al. | |
| 2009/0059630 A1 | 3/2009 | Williams | |
| 2009/0079409 A1 | 3/2009 | Chang | |
| 2009/0115392 A1 | 5/2009 | Shimizu | |
| 2010/0194369 A1 | 8/2010 | Nagai et al. | |
| 2010/0231186 A1 | 9/2010 | Chen et al. | |
| 2010/0237845 A1 | 9/2010 | Scaldaferri et al. | |
| 2011/0156481 A1 | 6/2011 | Lin et al. | |
| 2011/0241637 A1 | 10/2011 | Parker | |
| 2012/0001610 A1 | 1/2012 | Klein | |
| 2012/0074916 A1 | 3/2012 | Trochut | |
| 2012/0078556 A1 | 3/2012 | Holmberg et al. | |
| 2012/0105034 A1 | 5/2012 | Brown et al. | |
| 2012/0217946 A1 | 8/2012 | Ju | |
| 2012/0229111 A1 | 9/2012 | Serdarevic | |
| 2012/0262140 A1 | 10/2012 | Divan | |
| 2013/0242616 A1 | 9/2013 | Oldenkamp | |
| 2014/0002053 A1 | 1/2014 | Wang et al. | |
| 2014/0084883 A1 | 3/2014 | Tanabe | |
| 2014/0097813 A1 | 4/2014 | Dally | |
| 2014/0210434 A1 | 7/2014 | Dally | |
| 2014/0218001 A1 | 8/2014 | Dally | |
| 2014/0225579 A1 | 8/2014 | Dally | |
| 2014/0232360 A1 | 8/2014 | Dally | |
| 2014/0232361 A1 | 8/2014 | Dally | |

FOREIGN PATENT DOCUMENTS

| | | |
|---|---|---|
| CN | 101167239 A | 4/2008 |
| CN | 101202510 A | 6/2008 |
| CN | 101330253 A | 12/2008 |
| CN | 101976960 A | 2/2011 |
| CN | 102064697 A | 5/2011 |
| CN | 102265234 A | 11/2011 |
| CN | 102315774 A | 1/2012 |
| CN | 102742135 A | 10/2012 |
| DE | 4334128 A1 | 4/1994 |
| DE | 10243885 A1 | 4/2004 |
| DE | 102013219793 A1 | 4/2014 |
| DE | 102013114656 A1 | 7/2014 |
| DE | 102013114097 A1 | 8/2014 |
| DE | 102013114588 A1 | 8/2014 |
| EP | 0508673 B1 | 6/1998 |
| TW | I278171 B | 4/2007 |
| TW | I299606 B | 8/2008 |
| TW | 200843311 A | 11/2008 |
| WO | 2011029875 A2 | 3/2011 |
| WO | 2012176006 A1 | 12/2012 |

OTHER PUBLICATIONS

Final Office Action from U.S. Appl. No. 13/754,791, dated Apr. 20, 2015.

Rao, S. et al., "A 1.2-Buck-Boost LED Driver With On-Chip Error Averaged SenseFET-Based Current Sensing Technique," IEEE Journal of Solid-State Circuits, vol. 46, No. 12, Dec. 2011, pp. 1-12.

Mengmeng Du et al., "An Integrated Speed- and Accuracy-Enhanced CMOS Current Sensor With Dynamically Biased Shunt Feedback for Current-Mode Buck Regulators," IEEE Transactions on Circuits and Systems-I: Regular Papers, vol. 57, No. 10, Oct. 2010, pp. 2804-2814.

Non-Final Office Action from U.S. Appl. No. 13/770,975, dated May 11, 2015.

Non-Final Office Action from U.S. Appl. No. 13/770,982, dated Dec. 5, 2014.

Non-Final Office Action from U.S. Appl. No. 13/754,791, dated Sep. 11, 2014.

Non-Final Office Action from U.S. Appl. No. 13/759,964, dated Oct. 7, 2014.

Non-Final Office Action from U.S. Appl. No. 13/763,516, dated Oct. 7, 2014.

Examination Report from German Patent Application No. 10 2013 114 331.8, dated Sep. 4, 2014.

Examination Report from German Patent Application No. 10 2013 114 248.6, dated Aug. 8, 2014.

Examination Report from German Patent Application No. 10 2013 114 656.2, dated Aug. 7, 2014.

Examination Report from German Patent Application No. 10 2013 114 588.4, dated Aug. 7, 2014.

Examination Report from German Patent Application No. 10 2013 114 097.1, dated Sep. 4, 2014.

Billings et al., "Switchmode Power Supply: Handbook," McGraw Hill, Third Edition, 2011, pp. 1.145-1.150; pp. 2.163-2.176; pp. 3.119-3.155.

Infineon, "High Current PN Half Bridge NovalithIC," Automotive Power, BTN7930 Data Sheet, Rev. 1.1, Nov. 2007, pp. 1-28.

Redl et al., "Ripple-Based Control of Switching Regulators—An Overview," IEEE Transaction on Power Electronics, vol. 24, No. 12, Dec. 2009, pp. 2669-2680.

Yousefzadeh et al., "Proximate Time-Optimal Digital Control for Synchronous Buck DC—DC Converters," EEE Transaction on Power Electronics, vol. 23, No. 4, Jul. 2008, pp. 2018-2026.

Final Office Action from U.S. Appl. No. 13/759,964, dated Jun. 5, 2015.

Final Office Action from U.S. Appl. No. 13/770,982, dated Jul. 16, 2015.

Advisory Action from U.S. Appl. No. 13/754,791, dated Jul. 9, 2015.

Final Office Action from U.S. Appl. No. 13/763,516, dated Jun. 19, 2015.

Advisory Action from U.S. Appl. No. 13/759,964, dated Aug. 27, 2015.

Notice of Allowance from U.S. Appl. No. 13/770,975, dated Nov. 6, 2015.

(56) References Cited

OTHER PUBLICATIONS

Advisory Action from U.S. Appl. No. 13/770,982, dated Oct. 6, 2015.
Office Action from Chinese Patent Application No. 201310745918.4, dated Dec. 2, 2015.
Non-Final Office Action from U.S Appl. No. 13/759,964, dated Dec. 22, 2015.
Office Action from Chinese Patent Application No. 201310745983.7, dated Dec. 18, 2015.
Final Office Action from U.S. Appl. No. 13/754,791, dated Jan. 8, 2016.
Notice of Allowance from U.S. Appl. No. 13/763,516, dated Dec. 31, 2015.
Non-Final Office Action from U.S Appl. No. 13/770,982, dated Jan. 13, 2016.
Notice of Allowance from U.S. Appl. No. 13/770,975, dated Mar. 3, 2016.
Final Office Action from U.S. Appl. No. 13/759,964, dated Apr. 8, 2016.
Non-Final Office Action from U.S. Appl. No. 13/754,791, dated May 16, 2016.
Notice of Allowance from U.S. Appl. No. 13/763,516, dated May 20, 2016.

* cited by examiner

CURRENT-PARKING SWITCHING REGULATOR WITH A SPLIT INDUCTOR

FIELD OF THE INVENTION

The present invention relates to regulator circuits.

BACKGROUND

Conventional devices such as microprocessors and graphics processors that are used in high-performance digital systems may have varying current demands based on the processing workload. For example, current demands may increase dramatically when a block of logic is restarted after a stall or when a new request initiates a large computation such as the generation of a new image. Conversely, current demands may decrease dramatically when a block of logic becomes idle. When the current demand increases and sufficient power is not available, the supply voltage that is provided to the device may drop below a critical voltage level, potentially causing the device to fail to function properly. When the current demand decreases and the supply voltage that is provided to the device rises above a critical voltage level, circuits within the device may fail to function properly and may even be destroyed.

A conventional multi-phase switching regulator is an electric power conversion device that interfaces between a power supply and a device, providing current to the device and responding to changes in current demands to maintain a supply voltage level. However, a conventional multi-phase switching regulator relies on a large inductor for voltage conversion and the large inductor limits the ability of the conventional multi-phase switching regulator to quickly respond to dramatic changes in current demands (i.e., current transients). A typical 30 A phase of the conventional multi-phase switching regulator may use a 0.5 µH inductor for voltage conversion. The current response is limited to $di/dt=V/L$ which for V=11V (dropping a 12V input to a 1V supply voltage level) and L=0.5 µH gives 22 A/µs. Increasing the current provided to a device by 10 A in would require at least 500 ns. Additionally, synchronization of the pulse width modulation switching operation may increase the current response time of the conventional multi-phase switching regulator by several microseconds. When a clock period of the device is less than the current response time, the device may fail to function properly. A 500 MHz clock has a period of 2 ns, so hundreds of clock periods may occur during a 500 ns current response time.

Thus, there is a need for improving regulation of voltage levels and/or other issues associated with the prior art.

SUMMARY

A system and method are provided for regulating a voltage level at a load. The method configures a current control mechanism to generate a current through a first inductor and a second inductor that are coupled in series and configures a voltage control mechanism to provide a portion of the current to regulate the voltage level. The second inductor isolates the load from a parasitic capacitance of the current control mechanism. An electric power conversion device for regulating the voltage level at the load comprises a current control mechanism that is coupled to an electric power source and configured to generate a current through the first inductor and the second inductor that are coupled in series and the voltage control mechanism that is coupled to the second inductor and configured to provide a portion of the current to regulate the voltage level.

DETAILED DESCRIPTION

An electric power conversion device provides a desired output voltage level to a load, such as a device. The electric power conversion device converts power received from a power source (e.g., battery or main power supply) to a supply voltage level that is provided to the load. An inductor is used to deliver additional current to the load and regulate the output voltage level with switching mechanisms modulating the average current that flows through the inductor. A capacitor is coupled between the load and ground to store any excess current (difference between the current provided through the inductor and the current delivered to the load).

Figure 1A:
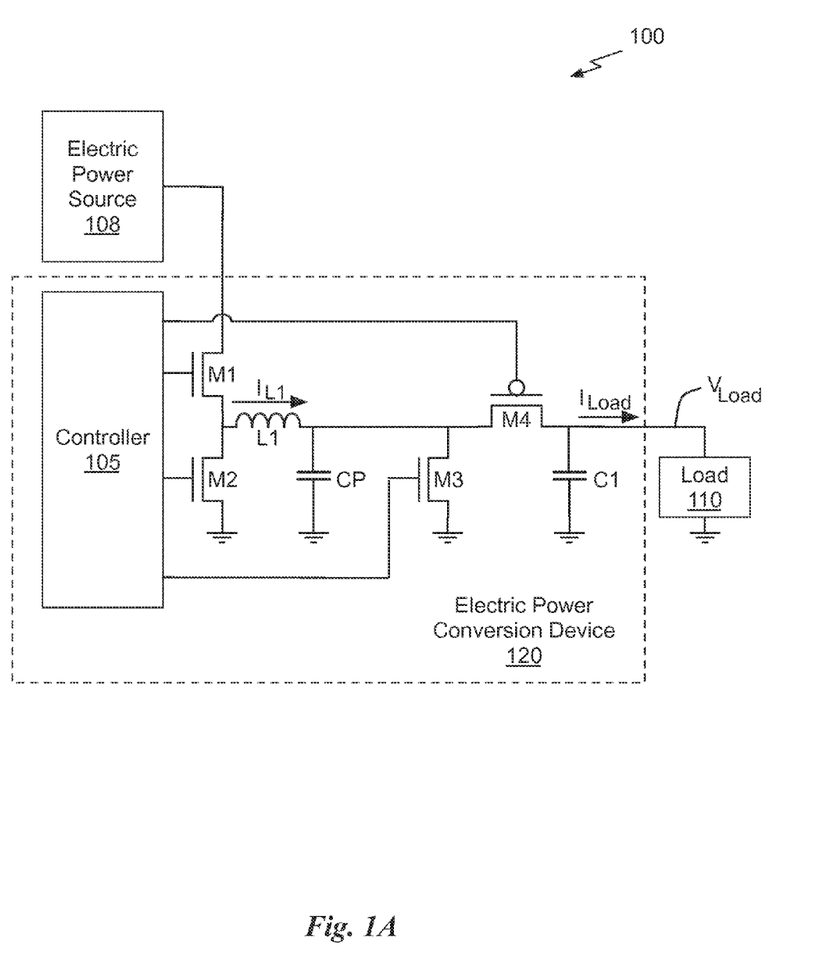
FIG. 1A illustrates an electric power conversion system including an electric power conversion device that is implemented as a current-parking switching regulator with a single inductor, in accordance with one embodiment.
Figure 1B:
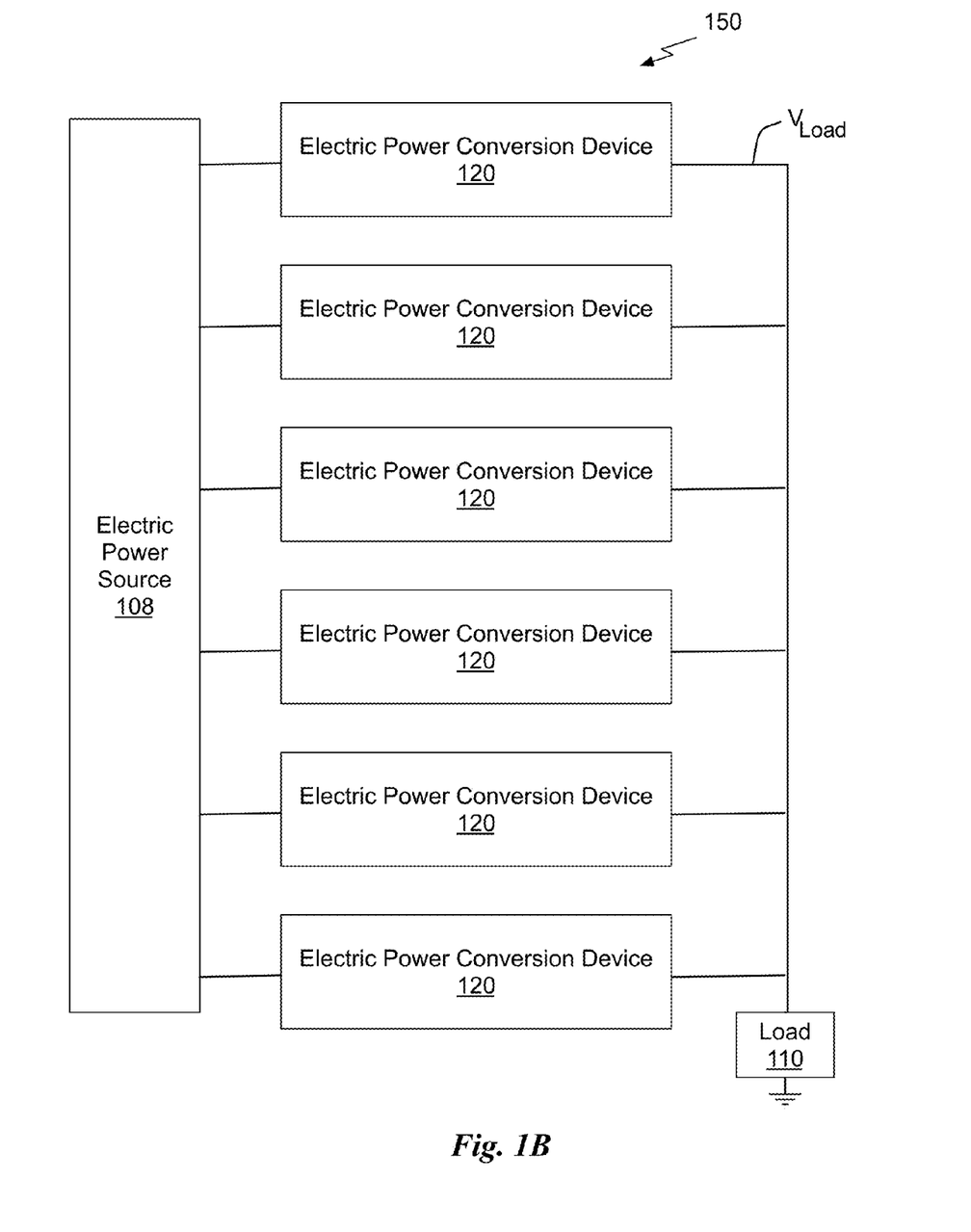
FIG. 1B illustrates a multi-phase switching regulator that includes multiple electric power conversion devices, in accordance with one embodiment.

FIG. 1A illustrates an electric power conversion system 100 including an electric power conversion device 120 that is implemented as a current-parking switching regulator with a single inductor L1, in accordance with one embodiment. The electric power conversion device 120 may be one phase of a multi-phase switching regulator, as shown in FIG. 1B. The electric power conversion device 120 is configured to provide a desired output voltage level ($V_{Load}$) at the load 110 by converting power received from an electric power source 108. The electric power conversion device 120 includes a current control mechanism and a voltage control mechanism. The current control mechanism is coupled to the electric power source 108 and the controller 105 and is operable to control the average of the current $I_{L1}$ flowing through the inductor L1 and ensure a minimum current is provided across the multiple phases of a multi-phase switching regulator. For example, as illustrated, the current control mechanism may include one or more first switching mechanisms M1 and one or more second switching mechanisms M2. The switching mechanisms M1 and M2 may each include, for example, N-type power MOSFETs (metal oxide semiconductor field-effect transistor), and/or other switching mechanisms. Although single switching mechanisms M1 and M2 is illustrated for the ease of understanding, it will be appreciated that a plurality of switching mechanisms M1 and M2 may be connected in parallel to increase current capacity, decrease conduction losses, and the like.

The controller 105 is configured to apply one or more control signals to the switching mechanisms M1 and M2. For example, the controller 105 may be configured to generate pulse width modulation (PWM) signals or pulse frequency modulation (PFM) signals, a combination of PWM and PFM, and/or different control signals to selectively enable the switching mechanisms M1 and M2 according to a duty factor. Regardless of the specific configuration, the controller 105 is configured to provide control signals such that the switching mechanisms M1 and M2 are not concurrently enabled. In other words, only one of switching mechanism M1 and M2 is enabled at a time. Enabling switching mechanisms M1 and M2 concurrently provides a direct path between the supply of electric power source 108 and ground, thereby potentially damaging the electric power conversion device 120 and/or the load 110 and/or resulting in undesirable high power usage.

In contrast with conventional electric power conversion devices, the electric power conversion device 120 includes the voltage control mechanism in addition to the current control mechanism. The voltage control mechanism is coupled between the current control mechanism (at the downstream end of the inductor L1) and the load 110 and is operable to control the $V_{Load}$. The voltage control mechanism is operable to control the amount of the inductor current $I_{L1}$ that is delivered to a capacitor C1. As such, the voltage control mechanism comprises one or more switching mechanisms M3 and one or more switching mechanisms M4. The switching mechanisms M3 and M4 may each include, for example, N-type planar MOSFETs (metal oxide semiconductor field-effect transistor), and/or other switching mechanisms. Although single switching mechanisms M3 and M4 are illustrated for the ease of understanding, it will be appreciated that a plurality of switching mechanisms M3 and M4 may be connected in parallel to increase current capacity, decrease conduction losses, and the like.

A conventional electric power conversion device does not include the switching mechanisms M3 and M4, so the inductor L1 would instead be coupled directly to the capacitor C1 and the load 110. Any excess current that flows through the inductor L1 and is not consumed by the load 110 is accumulated on the capacitor C1 and any current drawn by the load 110 that exceeds the current provided by the inductor L1 is sourced by the capacitor C1. The inductor L1 resists changes in current, thereby preventing the stored energy in the inductor L1 from being released all at once to the load 110 when the current demands of the load 110 increase. This property of inductors, along with the storage capacity of the capacitor C1 enable $V_{Load}$ to be sufficiently stable during steady-state operation (i.e., when the current demand of the load 110 is relatively constant). Nonetheless, there is some "ripple" in $V_{Load}$ that depends on the size of the inductor L1, the size of the capacitor C1, and/or the switching frequency of the controller 105, among other factors. Generally speaking, as the size of the inductor L1 increases, the output ripple during steady state operation (i.e., approximately constant current demand at the load 110) proportionally decreases. Accordingly, the inductor L1 may be sized large enough in order to provide a $V_{Load}$ that does not fluctuate outside a desired supply voltage range for the load 110. However, as previously explained, a conventional electric power conversion device is typically unable to respond to changes in the current needs of the load 110 quickly enough. The large inductance of L1 that is needed to reduce the ripple at $V_{Load}$ increases the response time, producing larger voltage deviations when the current demand of the load 110 varies. The voltage control mechanism that is included in the electric power conversion device 120 enables faster response time to changes in current demand of the load 110 without necessitating decreasing the size of the inductor L1 which may cause the voltage ripple at $V_{Load}$ to increase.

In contrast to the switching mechanisms M1 and M2, the voltage across the switching mechanisms M3 and M4 may be substantially less than the voltage drop across the inductor L1. For example, the voltage supplied at the downstream of the inductor L1 may be substantially equivalent to the output voltage at the load 110. Because the switching mechanisms M3 and M4 are switching a lower voltage, the switching mechanisms M3 and M4 may be constructed from lower-voltage devices, such as "planar" MOS transistors, as compared to the switching mechanisms M1 and M2. Lower-voltage devices can typically be switched at higher frequencies compared with higher-voltage devices, such as power MOSFETs. Therefore, power loss due to switching is reduced for the switching mechanisms M3 and M4 compared with the switching mechanisms M1 and M2. Hence switching mechanisms M3 and M4 can be switched at a substantially higher frequency than switching mechanisms M1 and M2.

Switching mechanisms M3 and M4 may be incorporated into an integrated circuit, thereby potentially reducing space used and/or reducing cost compared with using discrete components. For example, the switching mechanisms M3 and M4 may be realized on the same integrated circuit as the load 110, may be integrated on a separate die on the same package as the load 110, or may be integrated on a separate package. The switching mechanisms M3 and M4 may be realized as standard-voltage "core" transistors in a typical digital integrated-circuit process, or the switching mechanisms M3 and M4 may be realized as higher-voltage thick-oxide input-output transistors in a typical integrated-circuit process. In a preferred embodiment, the switching mechanism M4 is a P-type planar MOSFET and the switching mechanism M3 is an N-type planar MOSFET. However, one of ordinary skill in the art will understand that either type of MOSFET may be used for either switching mechanism with appropriate gate-drive circuitry without departing from the scope of the present disclosure.

The controller 105 may be further configured to apply one or more control signals to the voltage control mechanism. For example, the controller 105 may be configured to provide control signals to the switching mechanisms M3 and M4. As with the control signals provided to the switching mechanisms M1 and M2, the control signals that are provided to the switching mechanisms M3 and M4 may utilize PWM, PFM, bang-bang control, and/or any other suitable control schema in order to selectively enable the switching mechanism M3 or the switching mechanism M4. In some embodiments the control signals coupled to the switching mechanisms M3 and M4 may be at least partially synchronous with the control signals coupled to the switching mechanisms M1 and M2. In other embodiments, the control signals coupled to the switching mechanisms M3 and M4 may be asynchronous with the control signals coupled to the switching mechanisms M1 and M2. Furthermore, the control signals coupled to the switching mechanisms M3 and M4 may be provided at a different frequency than the control signals that are coupled to the switching mechanisms M1 and M2.

Regardless of the specific configuration of the control signals that are coupled to the switching mechanisms M3 and M4, the controller 105 may be configured to selectively enable the switching mechanism M3 and disable the switching mechanism M4 to disable the flow of current $I_{L1}$ to the load 110. Specifically, by enabling the switching mechanism M3 and disabling the switching mechanism M4, the instantaneous inductor current $I_{L1}$ flowing through the inductor L1 is diverted through the switching mechanism M3 to ground instead of being delivered to the capacitor C1. Conversely, by enabling the switching mechanism M4 and disabling the switching mechanism M3, substantially all of the instantaneous inductor current $I_{L1}$ flowing through the inductor L1 (less transistor conduction losses, inductor winding resistance, and the like) is provided to the capacitor C1.

The controller 105 may use PWM or PFM to switch the voltage control mechanism or may use a bang-bang technique. In either case, the duty factor (D) determines the portion of the inductor current $I_{L1}$ that on average is supplied to the capacitor C1. The duty factor may range from 0-100%, where 0% corresponds to the state where the switching mechanism M4 is disabled and the switching mechanism M3 is enabled and a 100% corresponds to the state where the switching mechanism M4 is enabled and the switching mechanism M3 is disabled. Changing the duty factor thereby changes the charge/discharge timing of the capacitor C1—a higher duty factor increases the current flow to the capacitor C1 and the load 110.

The capacitor C1 smoothes the square wave supply current provided through the switching mechanism M4 to generate $I_{Load}$ that is provided to the load 110. The $I_{Load}$ is provided to the load 110 according to the duty factor and the inductor current $I_{L1}$, as follows: $I_{Load}=D \times I_{L1}$. As with the switching mechanisms M1 and M2, controls signals are provided to the switching mechanisms M3 and M4 such that the switching mechanisms M3 and M4 are not concurrently enabled to avoid providing a direct path between the load 110 and ground (i.e., a short circuit across the capacitor C1).

During steady-state operation, the switching mechanism M3 is disabled and the switching mechanism M4 is enabled, such that substantially all of the inductor current $I_{L1}$ is provided to the load 110 as $I_{Load}$. The switching mechanisms M1 and M2 are selectively enabled ("switched") in order to control the inductor current $I_{L1}$, thereby controlling $V_{Load}$. In this manner, if the voltage provided to the load 110 ($V_{Load}$) is constant, the current provided through the switching mechanism M4 is substantially equivalent to the inductor current $I_{L1}$.

In sum, the current control mechanism is configured to generate current $I_{L1}$ that is parked in the inductor L1 and metered out to the load 110 by the voltage control mechanism. Because the voltage levels applied to the switching mechanisms M3 and M4 are low (i.e., the supply voltage of the load 110), the switching mechanisms M3 and M4 may be implemented as fast, inexpensive planar transistors and can be operated at very high frequency (e.g., 300 MHz) allowing very rapid response to current transients at the load 110. When the current demand at the load 110 changes (i.e., not steady-state operation), the switching mechanisms M3 and M4 of the voltage control mechanism may be controlled to quickly respond to the change in current demand by increasing or decreasing the amount of the current $I_{L1}$ this is metered out to the load 110. In general, the switching frequency of the current control mechanism is slower than the switching frequency of the voltage control mechanism due to the different types of switching mechanisms that are used.

A lumped element CP in the electric power conversion device 120 represents the parasitic capacitance on the downstream side of the inductor L1. Each time the switching mechanisms M3 and M4 are switched, the parasitic capacitance CP is charged to the load voltage $V_{Load}$ (when the switching mechanism M4 is enabled) and then discharged to ground (when the switching mechanism M3 is enabled). Thus, each switching cycle of the switching mechanisms M3 and M4 an energy $E_P$ of $$E_P = (CP)V_L^2$$

is dissipated by charging and discharging the parasitic capacitance CP.

In a typical embodiment of the electric power conversion device 120, the inductor L1 is a surface mount 0.5 uH 30 A inductor, the switching mechanisms M3 and M4 are located on the package, and the capacitor C1 is on-chip and on-package bypass capacitance. Capacitor CP includes the capacitance of the vias, board traces, and package traces between the inductor L1 and the switching mechanisms M3 and M4. In a typical application the capacitance CP may total as much as 500 pF. If CP=500 pF and $V_{Load}$=1V, then $E_P$ is 500 pJ. At a switching frequency of 300 MHz, 150 mW is dissipated charging and discharging CP. When the current control mechanism and the voltage control mechanism of the electric power conversion device 120 are configured as one of a plurality of phases of a regulator, $E_P$ is scaled by the number of phases for the total energy that is dissipated due to the cumulative parasitic capacitance.

This switching power increases as the switching frequency ($f_s$) of the switching mechanisms M3 and M4 is increased. One would like to switch the switching mechanisms M3 and M4 at a high frequency to minimize the required size of C1 that is given by $$C_1 = \frac{I_{L1}(1-D)}{f_S V_R}$$

where D is the duty factor of the switching mechanism M4 and $V_R$ is a ripple voltage of $V_{Load}$.

For example with a phase current of 30 A, a frequency of 300 MHz, and a ripple voltage of 20 mV the required capacitance C1 is 5 uF per phase. C1 is typically distributed across many smaller capacitors on the package to give low series inductance and to provide a flat impedance as a function of the switching frequency. Increasing the switching frequency reduces the required size of C1 but at the expense of increased switching power $E_P$.

An advantage of a current-parking switching regulator, such as the electric power conversion device 120, is that C1 is the only filter capacitance needed. In comparison, a conventional electric power conversion device that does not include the switching mechanisms M3 and M4 relies on a large (hundreds of µF) filter capacitance to filter the low frequency (typically 300 kHz) ripple.

The configuration of the electric power source 108, the controller 105, the switching devices M1 and M2, and the inductor L1 shown in FIG. 1A is typically referred to as a "buck" converter. While the electric power conversion device 120 is described in the context of this buck converter, one of ordinary skill in the art will understand that the techniques described to regulate a voltage provided to the load 110 can be applied to other "switch-mode" power conversion circuits including, but not limited to, a forward converter, a half-bridge converter, a full-bridge converter, a flyback converter, and/or variants thereof.

FIG. 1B illustrates multi-phase switching regulator 150 that includes electric power conversion devices 120, in accordance with one embodiment. Each of the electric power conversion devices 120 is one phase of a six-phase switching regulator. Each electric power conversion device 120 is configured to provide a desired output voltage level ($V_{Load}$) at the load 110 by converting power received from an electric power source 108 for one phase of the six phases. A single controller may be used to control each of the electric power conversion devices 120 or each electric power conversion device 120 may include a dedicated controller 105 (as shown in FIG. 1B). Additionally, one or more of the electric power conversion devices 120 may be replaced with a current-parking switching regulator with a split inductor or a conventional electric power conversion device.

Figure 2:
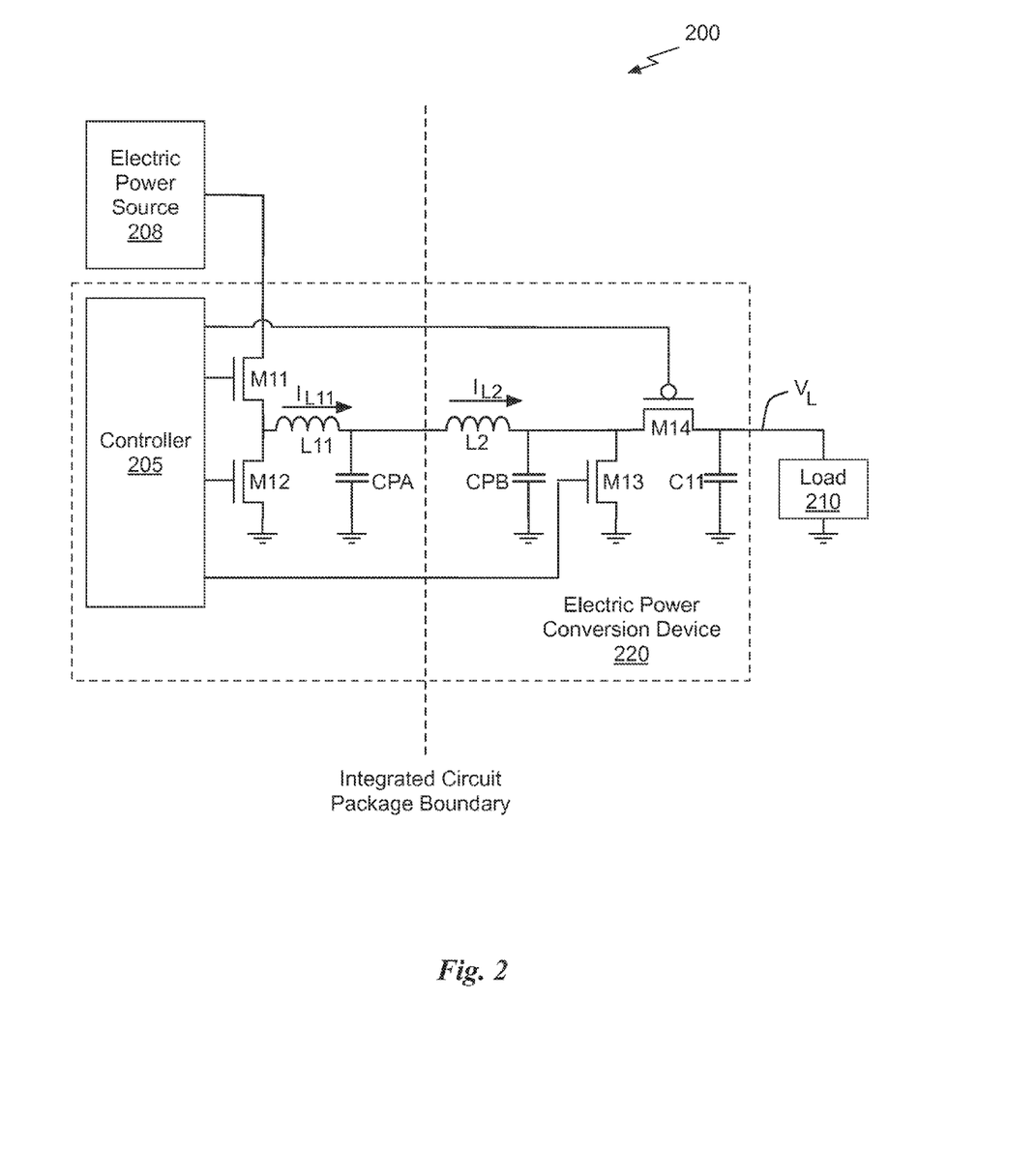
FIG. 2 illustrates a current-parking switching regulator with a split inductor, in accordance with one embodiment.

FIG. 2 illustrates an electric power conversion system 200 including an electric power conversion device 220 that is implemented as a current-parking switching regulator with a split inductor, in accordance with one embodiment. Compared with the electric power conversion device 120 shown in FIG. 1A, the electric power conversion device 220 includes a first inductor L11 that is coupled in series with a second inductor L2 to form a split inductor. Splitting the inductor reduces losses due to parasitic capacitance CPA on the downstream side of the first inductor L11.

The electric power conversion device 220 may be one phase of a multi-phase switching regulator. The electric power conversion device 220 is configured to provide a desired output voltage level ($V_L$) at the load 210 by converting power received from an electric power source 208. The electric power conversion device 220 includes a current control mechanism and a voltage control mechanism. The current control mechanism is coupled to the electric power source 208 and the controller 205 may be configured to generate control signals in the same manner as the controller 105 and is operable to control the average of the current $I_{L11}$ flowing through the inductor L11 and the current $I_{L2}$ flowing through the inductor L2. For example, as illustrated, the switching mechanisms M11 and M12 are configured and operable in the same manner as previously described switching mechanisms M1 and M2, respectively. Similarly, the switching mechanisms M13 and M14 are configured and operable in the same manner as previously described switching mechanisms M3 and M4, respectively. The capacitor C11 performs substantially the same function as the capacitor C1.

Using two different inductors L11 and L2 to form a split inductor reduces the switching energy so that the bulk of the parasitic capacitance falls between the inductor L11 and L2, shown as a first parasitic capacitance CPA. In one embodiment, L11 is a 0.5 pH 30 A first inductor on a printed circuit board (e.g., a discrete component) and the second inductor L2 is a 1 nH inductor in the package that encloses the load 210. The first parasitic capacitance CPA includes the capacitance of the vias, board traces, and package traces between the first inductor L11 and the second inductor L2. The first parasitic capacitance CPA may be approximately 490 pF. The second parasitic capacitance CPB consists primarily of the drain capacitance of the switching mechanisms M13 and M14 and may be approximately 10 pF. If CPB=10 pF and $V_{Load}$=1V, then $E_P$ is 10 pJ and, at a switching frequency of 500 MHz, 5 mW is dissipated charging and discharging CPB.

The switching frequency of 500 MHz, allows use of a 0.5 µF capacitor (implemented as a distributed array of smaller capacitors in some embodiments) for the capacitor C11. The 1 nH inductance of the second inductor L2 can be formed by integrating a ferrite bead around the traces or bumps carrying the current $I_{L2}$ or by simply running a trace a suitable distance from the ground return (making the second inductor L2 a planar air-core inductor). The resonant frequency of the tank circuit formed by L2 and the first parasitic capacitance CPA is $f_r$=230 MHz. Thus, as long as the switching frequency of the switching mechanisms M13 and M14 is high compared to $f_r$, the capacitance of the first parasitic capacitance CPA is effectively isolated from the switching node $V_L$. Because the first parasitic capacitance CPA is located between the first inductor L11 and the second inductor L2, CPA is isolated and is lossless. Any excess current is stored in the split inductor formed by the first inductor L11 and the second inductor L2.

Figure 3A:
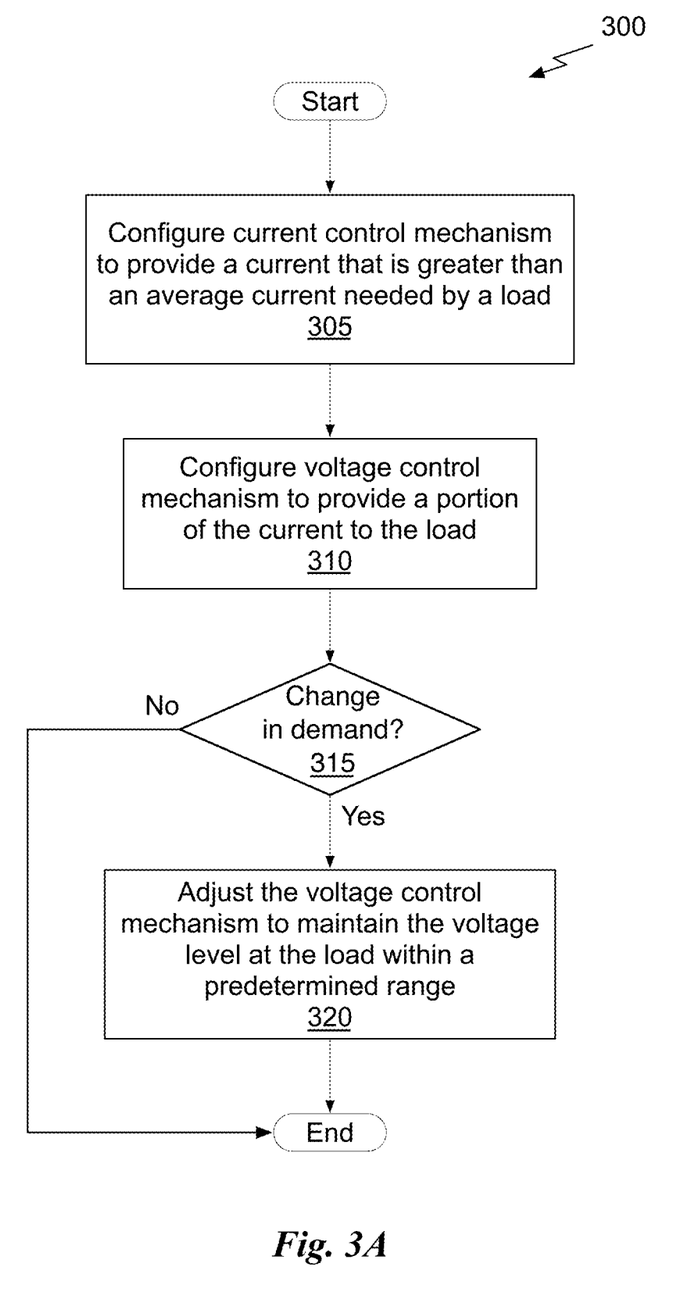
FIG. 3A illustrates a flowchart of a method for regulating the voltage level provided to a load, in accordance with one embodiment.

FIG. 3A illustrates a flowchart 300 of a method for regulating the voltage level at a load, in accordance with one embodiment. At step 305, a current control mechanism is configured to provide a current that is greater than an average current needed by a load. At step 310, a voltage control mechanism is configured to provide a portion of the current to the load. At step 315, if a change in the current demand of the load occurs, the control of the electric power conversion device to regulate the voltage level provided to the load is complete. Otherwise, at step 320, the voltage control mechanism is adjusted to increase or decrease the portion of the current that is provided to the load and maintain the voltage level at the load within a predetermined range.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3B:
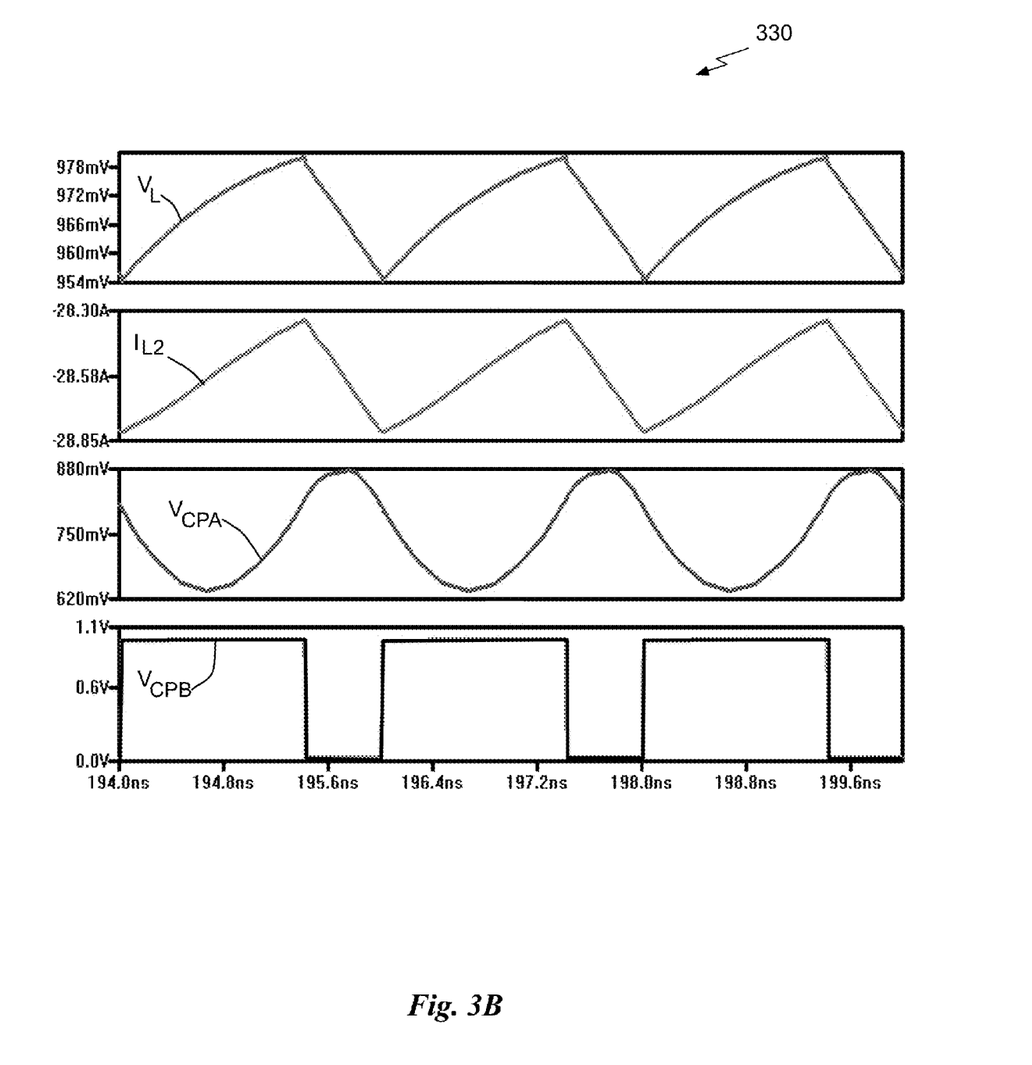
FIG. 3B illustrates waveforms corresponding to the current-parking switching regulator with a split inductor shown in FIG. 2, in accordance with one embodiment.

FIG. 3B illustrates waveforms 330 corresponding to the current-parking switching regulator with a split inductor shown in FIG. 2, in accordance with one embodiment. The top trace shows the load voltage $V_L$ across the capacitor C11. As shown, the range of $V_L$ is designed to be approximately 20 mV.

The second trace shows the current $I_{L2}$ through the second inductor L2 which has an 0.55 A ripple on a DC current of approximately 28.5 A. As inductors resist changes in current, the current $I_{L2}$ "ramps up" when the switching mechanism M14 is enabled to pass a portion of the current $I_{L2}$ to the load and the switching mechanism M13 is disabled. The current $I_{L2}$ "ramps down" when the switching mechanism M14 is disabled and the switching mechanism M13 is enabled to pull the $V_{CPB}$ to ground.

The third trace shows the 250 mV voltage ripple of the voltage $V_{CPA}$ across the first parasitic capacitance CPA. The voltage ripple can be reduced by increasing the inductance of the second inductor L2. However, because no power is dissipated due to the resonant voltage ripple of the voltage $V_{CPA}$ there is no motivation to increase the inductance of the second inductor L2. The bottom trace shows the voltage $V_{CPB}$ across the second parasitic capacitance CPB. The 1V 500 MHz waveform of Vcrs occurs across the second parasitic capacitance CPB (10 pF) and does not occur across the larger first parasitic capacitance CPA, thereby reducing the switching power compared using a single inductor. The waveform for $V_{CPB}$ corresponds to the duty factor that is applied (or produced) by the controller 205 to control the portion of current provided to the load by the voltage control mechanism.

Figure 3C:
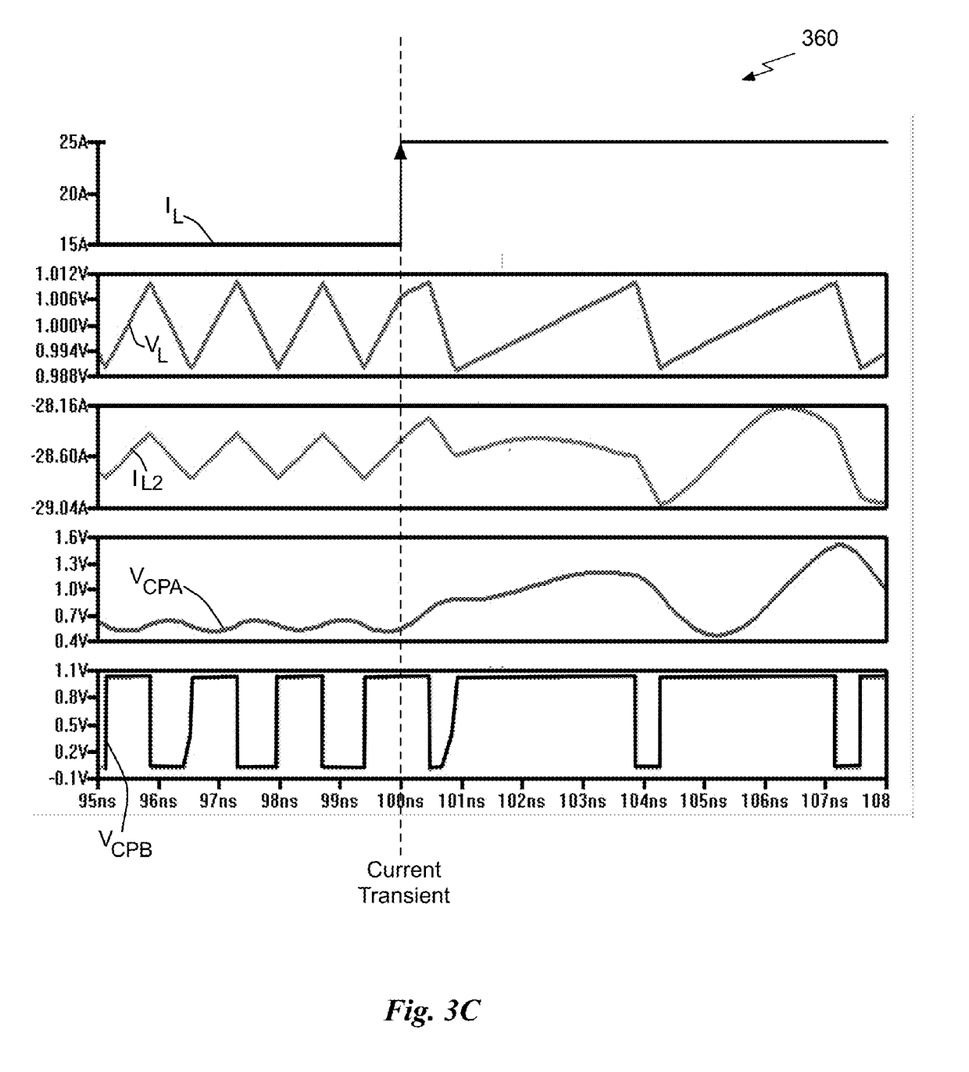
FIG. 3C illustrates waveforms corresponding to the current-parking switching regulator with a split inductor shown in FIG. 2 when a current transient occurs, in accordance with one embodiment.

FIG. 3C illustrates waveforms 360 corresponding to the current-parking switching regulator with a split inductor shown in FIG. 2 when a current transient occurs, in accordance with one embodiment. At 100 ns the load current $I_L$ is abruptly changed from 15 A to 25 A. The controller 205 may be implemented as a bang-bang controller that enables the switching mechanism M14 (and disables the switching mechanism M13) when $V_L$ drops below a minimum voltage level (e.g., 0.99V) and enables the switching mechanism M13 (and disables the switching mechanism M14) when $V_L$ rises above a maximum voltage level (e.g., 1.01V). By adjusting the voltage control mechanism, the controller 205 maintains $V_L$ within a predetermined voltage range of 20 mV.

The switching frequency drops after the current transient occurs because the duty factor controlling the voltage control mechanism increases to provide a greater portion of the current $I_{L2}$ to the load. The current transient does pump some energy into the tank circuit formed by the first parasitic capacitance CPA and the second inductor L2, causing a large voltage ripple across the first parasitic capacitance CPA as seen in the waveform for $V_{CPA}$. The large voltage ripple in $V_{CPA}$ is not an issue because there are no components that can be stressed by the voltage ripple in $V_{CPA}$. However, if desired, the voltage ripple in $V_{CPA}$ can be dampened with a passive RC snubber circuit.

The waveforms 360 illustrate how the current-parking regulator can quickly respond to a current transient that is within the range of the parked current $I_{L2}$. The use of the split inductor greatly reduces switching energy, enabling higher frequency operation as required to quickly respond to current transients. In turn, the higher frequency also enables the use of a smaller filter capacitor C11 compared with conventional electric power conversion devices.

Figure 4:
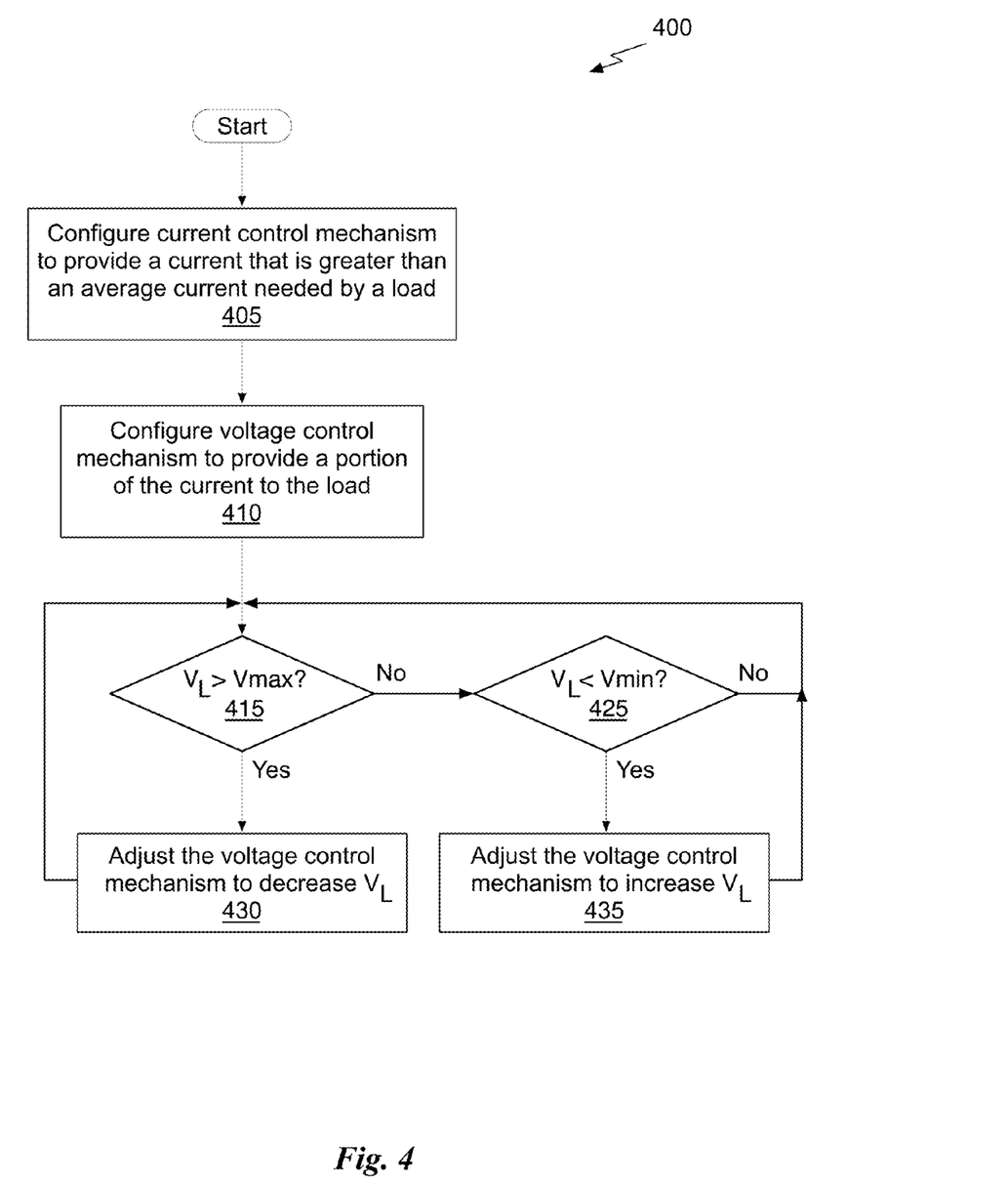
FIG. 4 illustrates another flowchart of a method for regulating the voltage level provided to a load, in accordance with one embodiment.

FIG. 4 illustrates another flowchart 400 of a method for regulating the voltage level at a load, in accordance with one embodiment. At step 405, a current control mechanism is configured to provide a current that is greater than an average current needed by the load 210. At step 410, a voltage control mechanism is configured to provide a portion of the current to the load 210.

At step 415, the controller 205 determines if the voltage at the load 210 ($V_L$) is greater than a maximum voltage level Vmax, and, if so, then, at step 430, the controller 205 adjusts the voltage control mechanism to provide a lesser portion of the current to the load 210 and decrease $V_L$. Otherwise, at step 425, the controller 205 determines if the voltage at the load 210 is less than a minimum voltage level Vmin, and, if so, then, at step 435, the controller 205 adjusts the voltage control mechanism to provide a greater portion of the current to the load 210 and increase $V_L$.

The portion of the current that is provided to the load 210 is determined by a duty factor that alternately enables a first switch (M14) allowing the current to flow to the load 210 while disabling a second switch (M13) and then enables the second switch to pull the second inductor L2 to ground while disabling the second switch to isolate the load 210 from the second inductor. In response to a current transient, the voltage control mechanism quickly increases or decreases the portion of the current that is provided to the load and maintain the voltage level at the load 210 within a predetermined range bounded by Vmin and Vmax. Specifically, when Vl is greater than Vmax, the duty factor is reduced to reduce the portion of the current that is provided to the load 210 and when $V_L$ is less than Vmin, the duty factor is increased to increase the portion of the current that is provided to the load 210.

Figure 5:
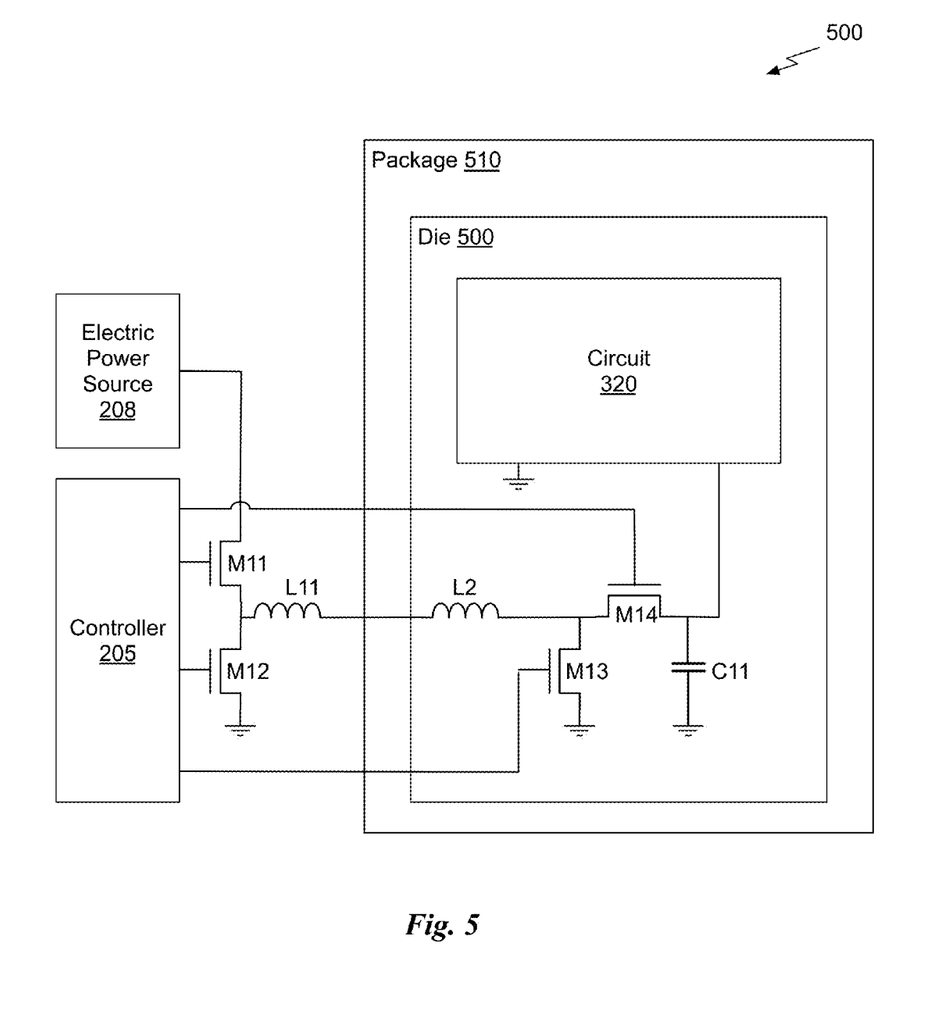
FIG. 5 illustrates a diagram of the current-parking switching regulator with a split inductor shown in FIG. 2 within a system, according to one embodiment.

FIG. 5 illustrates a system 500 including the current-parking switching regulator with a split inductor shown in FIG. 2 within a system, according to one embodiment. The electric power source 208 is coupled to the current control mechanism and the voltage control mechanism of the current-parking switching regulator with a split inductor. The controller 205 is configured to regulate the voltage level at the load, i.e., circuit 320. In one embodiment, the controller 205 is configured maintain the voltage level at the circuit 320 within a predetermined range bounded by $V_{min}$ and $V_{max}$.

The first inductor L11 is positioned outside of a package 510 that encloses the circuit 320. The second inductor L2 is positioned inside of the package 510, reducing the second parasitic capacitance CPB compared with the first parasitic capacitance CPA. The second inductor L2, the switching mechanisms M13 and M14, and the capacitor C11 may be fabricated as part of the die 500 that includes the circuit 320. In one embodiment, the second inductor L2 a planar air-core inductor and the switching mechanisms M13 and M14 are planar MOS transistors. Although a single phase of the current-parking switching regulator with a split inductor is shown in FIG. 5, multiple phases of the current-parking switching regulator with a split inductor or a combination of one or more current-parking switching regulators (with or without a split inductor) may be used with one or more conventional electric power conversion devices to provide power to the circuit 320.

Figure 6:
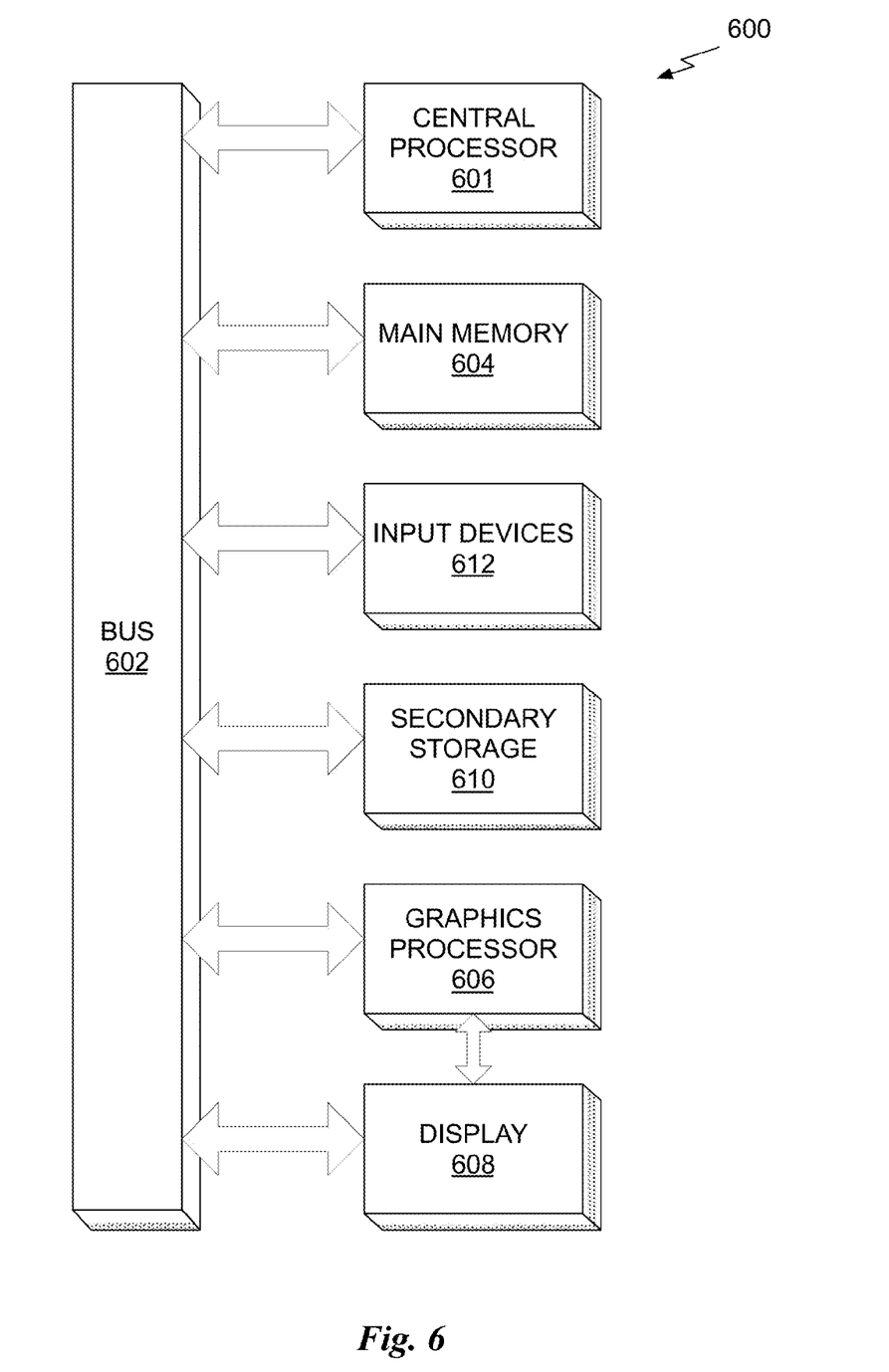
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. One or more of the systems 500 shown in FIG. 5 may be incorporated in the system 600 to provide power to one or more of the chips.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory 604 and/or the secondary storage 610. Such computer programs, when executed, enable the system 600 to perform various functions. The main memory 604, the storage 610, and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of regulating a voltage level at a load, comprising:
    configuring a current control mechanism to generate a current through a first inductor and a second inductor that are coupled in series, wherein the second inductor reduces losses due to a parasitic capacitance located between the first inductor and the second inductor;
    configuring a voltage control mechanism to provide a portion of the current to regulate the voltage level at the load, wherein a switching frequency of the current control mechanism is slower than a switching frequency of the voltage control mechanism; and
    adjusting the portion of the current provided to the load by increasing a duty cycle of the switching frequency of the voltage control mechanism in response to determining that the voltage level at the load is less than a minimum voltage level, or
    adjusting the portion of the current provided to the load by decreasing the duty cycle of the switching frequency of the voltage control mechanism in response to determining that the voltage level at the load is greater than a maximum voltage level.

2. The method of claim 1, wherein the first inductor is positioned outside of a package that encloses the load and the second inductor is positioned inside of the package and fabricated as part of a die that includes the load.

3. The method of claim 1, wherein the current is greater than an average current that is needed to regulate the voltage level at the load.

4. The method of claim 1, wherein the duty cycle alternately enables a first switch allowing the current to flow to the load while disabling a second switch and then enables the second switch to pull the second inductor to ground while disabling the first switch to isolate the load from the second inductor.

5. The method of claim 1, wherein the voltage control mechanism comprises:
    a first planar MOS (metal oxide semiconductor) transistor coupled between the second inductor and the load; and
    a second planar MOS transistor that is coupled between the second inductor and ground.

6. The method of claim 5, wherein the first planar MOS transistor is a P-type field-effect transistor and the second planar MOS transistor is an N-type field-effect transistor.

7. The method of claim 1, wherein the current control mechanism comprises one or more switching mechanisms that are controlled to selectively increase and decrease the current through the first inductor and the second inductor.

8. An electric power conversion device, comprising:
    a current control mechanism that is coupled to an electric power source and configured to generate a current through a first inductor and a second inductor that are coupled in series, wherein the second inductor reduces losses due to a parasitic capacitance located between the first inductor and the second inductor;
    a voltage control mechanism that is coupled to the second inductor and configured to provide a portion of the current to regulate a voltage level at a load, wherein a switching frequency of the current control mechanism is slower than a switching frequency of the voltage control mechanism; and
    a controller configured to adjust the portion of the current provided to the load by increasing a duty cycle of the switching frequency of the voltage control mechanism in response to determining that the voltage level at the load is less than a minimum voltage level or adjusting the portion of the current provided to the load by decreasing the duty cycle of the switching frequency of the voltage control mechanism in response to determining that the voltage level at the load is greater than a maximum voltage level.

9. The electric power conversion device of claim 8, wherein the voltage control mechanism comprises:
    a first planar MOS (metal oxide semiconductor) transistor coupled between the second inductor and the load; and
    a second planar MOS transistor that is coupled between the second inductor and ground.

10. The electric power conversion device of claim 9, wherein the first planar MOS transistor is a P-type field-effect transistor and the second planar MOS transistor is an N-type field-effect transistor.

11. The electric power conversion device of claim 8, wherein the controller is further configured to:
    provide one or more control signals to the current control mechanism to control an amount of the current through the first inductor and the second inductor; and
    provide one or more control signals to the voltage control mechanism to control the portion of the current to regulate the voltage level at the load.

12. The electric power conversion device of claim 8, wherein the current control mechanism comprises one or more switching mechanisms that are controlled to selectively increase and decrease the current through the first inductor and the second inductor.

13. The electric power conversion device of claim 8, wherein the voltage control mechanism comprises one or more switching mechanisms that are controlled to selectively increase and decrease the portion of the current to regulate the voltage level at the load.

14. The electric power conversion device of claim 8, wherein the first inductor is positioned outside of a package that encloses the load and the second inductor is positioned inside of the package.

15. The electric power conversion device of claim 8, wherein the voltage control mechanism is configured to maintain the voltage level at the load within a predetermined range.

16. The electric power conversion device of claim 8, wherein the duty cycle alternately enables a first switch allowing the current to flow to the load while disabling a second switch and then enables the second switch to pull the second inductor to ground while disabling the first switch to isolate the load from the second inductor.

17. The electric power conversion device of claim 8, wherein the current is greater than an average current that is needed to regulate the voltage level at the load.

18. A method of regulating a voltage level at a load, comprising:

configuring a current control mechanism to generate a current through a first inductor and a second inductor that are coupled in series, wherein the second inductor reduces losses due to a parasitic capacitance located between the first inductor and the second inductor and the first inductor is positioned outside of a package that encloses the load and the second inductor;

configuring a voltage control mechanism to provide a portion of the current to regulate the voltage level at the load, wherein a switching frequency of the current control mechanism is slower than a switching frequency of the voltage control mechanism; and adjusting the portion of the current provided to the load by increasing a duty cycle of the switching frequency of the voltage control mechanism in response to determining that the voltage level at the load is less than a minimum voltage level, or adjusting the portion of the current provided to the load by decreasing the duty cycle of the switching frequency of the voltage control mechanism in response to determining that the voltage level at the load is greater than a maximum voltage level.

\* \* \* \* \*